United States Patent Office 3,488,357
Patented Jan. 6, 1970

3,488,357
2-HALOPHENYL-2-AMINOALKOXY-PHENYL-PROPANES
William Laszlo Bencze, New Providence, N.J., assignor to Ciba Corporation, New York, N.Y., a corporation of Delaware
No Drawing. Continuation-in-part of application Ser. No. 167,160, Jan. 18, 1962. This application Apr. 7, 1967, Ser. No. 629,082
Int. Cl. C07d 29/18; C07c 93/06; A61k 27/00
U.S. Cl. 260—294.7    5 Claims

ABSTRACT OF THE DISCLOSURE

2 - (4 - halophenyl)-2-(4-aminoalkoxyphenyl)-propanes of the formula

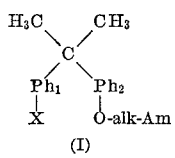

(I)

$Ph_{1,2}$=a 1,4-phenylene
X=halogen or trifluoromethyl
alk=lower alkylene
Am=tert. amino quaternaries and acid addition salts thereof, exhibit antifungal effects.

CROSS-REFERENCE TO RELATED APPLICATIONS

This is a continuation-in-art of application Ser. No. 563,369, filed July 7, 1966, which in turn is a continuation-in-part of application Ser. No. 314,526, filed Oct. 7, 1963, which in turn is a continuation-in-part of application Ser. No. 288,891, filed June 19, 1963, which in turn is a continuation-in-part of application Ser. No. 240,403, filed Nov. 27, 1962, which in turn is a continuation-in-part of applications Ser. Nos. 167,160, filed Jan. 18, 1962 and 169,673, filed Jan. 29, 1962. All of these applications are now abandoned.

SUMMARY OF THE INVENTION

The present invention concerns and has for its object the provision of new 2-(4-halophenyl)-2-(4-aminoalkoxyphenyl)-propanes, more particularly those of Formula I, in which each of $Ph_1$ and $Ph_2$ stands for a 1,4-phenylene radical, X for halogen or trifluoromethyl, alk for lower alkylene separating Am from the oxygen atom by at least 2 carbon atoms and Am for a tertiary amino group, quaternaries and acid addition salts thereof, as well as corresponding pharmaceutical compositions and methods for the preparation of the new compounds. Said compositions are useful as antifungal agents, particularly in the treatment of topical or systemic fungal infections, such as dermatophytosis, trichophytosis, moniliasis, sporotrichosis, cryptococcosis or histoplasmosis.

DESCRIPTION OF THE PREFERRED EMBODIMENTS

The 1,4-phenylene radicals $Ph_1$ and $Ph_2$ are unsubstituted or substituted by one or more than one of the same or of different substituents attached to any of the positions available for substitution. These substitutions are, for example, lower alkyl, having preferably from one to seven carbon atoms, e.g. methyl, ethyl, n- or i-propyl or -butyl, lower alkoxy, having preferably from one to seven carbon atoms, e.g. methoxy, ethoxy, n- or i-propoxy or -butoxy, halogeno, e.g. fluoro, chloro, bromo or iodo, trifluoromethyl, nitro or amino, preferably di-lower alkyl-amino, e.g. dimethylamino or diethylamino. Preferred radicals $Ph_1$ and $Ph_2$ are 1,4-phenylene, (lower alkyl)-1,4-phenylene, di-(lower alkyl) - 1,4- phenylene, (lower alkoxy)-1,4-phenylene, (halogeno)-1,4-phenylene, di-(halogeno)-1,4-phenylene, (lower alkyl, halogeno)-1,4-phenylene and (trifluoromethyl)-1,4-phenylene.

The halogen atom X may be such mentioned above, it preferably represents chloro, bromo or iodo.

The lower alkylene radical alk has preferably from two to seven carbon atoms, above all from two to three carbon atoms and separates the tertiary amino group Am from the oxygen atom by at least two carbon atoms. It represents, for example, 1,2-ethylene, 1,2- or 1,3-propylene, 1,2,- 1,3-, 2,3-, or 1,4-butylene, 1,4- or 1,5-pentylene, 1,5- or 1,6-hexylene or 1,7-heptylene.

The tertiary amino group Am is primarily di-lower alkylamino, such as dimethylamino, diethylamino, di-n-propylamino or di-isopropylamino, N-cycloalkyl-N-lower alkylamino in which cycloalkyl has from three to eight, preferably from five to seven, ring carbon atoms, such as N - cyclopentyl - N - methylamino, N - cyclohexyl - N-methylamino or N-cyclohexyl-N-ethylamino, N-phenyl-lower alkyl-N-lower alkylamino, such as N-benzyl-N-methylamino, N-benzyl-N-ethylamino, N-(1- or 2-phenylethyl)-N-methyl or ethylamino, N-hydroxy-lower alkyl-N-lower alkylamino or N,N-di-hydroxy-lower alkylamino, in which the hydroxyl group is separated from the nitrogen atom by at least two carbon atoms, such as N-(2-hydroxyethyl)-N-methylamino or di-(2-hydroxyethyl)-amino, lower alkyleneimino, mono-aza, oxa- or thia-alkyleneimino, in which the hetero atoms are seaprated from each other by at least two carbon atoms, and which radicals may be substituted by free or esterified hydroxy, e.g. lower alkanoyloxy, such as pyrrolidino, 2-methyl-pyrrolidino, piperidino, 2- or 4-methyl-piperidino, 3-hydroxy-piperidino, 3-acetoxy-piperidino, 3-hydroxymethyl-piperidino, 1,6-hexyleneimino or 1,7-heptyleneimino, piperazino or particularly 4-lower alkyl- or free or esterified 4-hydroxy lower alkyl-piperazino, e.g. 4-methyl-piperazino, 4-ethyl-piperazino, 4-(2-hydroxyethyl)-piperazino, 4-(2-acetoxyethyl)-piperazino, 3-methyl-4-phenyl-piperazino, 3-aza-1,6-hexyleneimino, 3-lower alkyl-3-aza-1,6-hexyleneimino, 4-aza-1,7-heptyleneimino, 4-lower alkyl-4-aza-1,7-heptyleneimino, 4-morpholino, 3-methyl-4-morpholino or 4-thiamorpholino.

The quaternaries of the invention are preferably those obtained from the compounds of Formula I with reactive esters of alcohols and strong inorganic or organic acids, particularly those with lower aliphatic halides, sulfates or sulfonates, such as lower alkyl halides, e.g. methyl, ethyl, n- or i-propyl chloride, bromide, iodide, di-lower alkyl sulfates, e.g. dimethyl or diethyl sulfate, lower alkyl lower alkane sulfonates, e.g. methyl or ethyl methane or ethane sulfonate, or lower alkyl lower hydroxyalkane sulfonates, eg. methyl 2-hydroxyethane sulfonate, or lower alkyl monocyclic carbocyclic aryl sulfonates, e.g. methyl p-toluene sulfonate or ethyl benzene sulfonate, or carbocyclic aryl-aliphatic halides, such as phenyl-lower alkyl halides, e.g. benzyl, 1- or 2-phenylethyl chloride, bromide or iodide. Also included as quaternaries are the corresponding quaternary ammonium hydroxides and their salts with acids other than hydrohalic, sulfuric or sulfonic acids, particularly those with the carboxylic acids mentioned for the salts below.

The compounds of the invention exhibit valuable pharmacological properties. Apart from antibacterial, antiprotozoal and taeniacidal effects, they show primarily antifungal activity, for example, against *Trichophyton mentagrophytes*, *gallinae* or *interdigitale*, *Microsporus audouini*, *canis* or *gypseum*, *Sporotrichium schenkii*, *Candida albicans*, *Cryptococcus neoformans* or *Histoplasma capsulatum*. This can be demonstrated in *in vitro* or *in vivo* tests using, for example, mammals, such as mice, guinea pigs, calves, swine or dogs, or birds, e.g. chicken, as test objects. Besides their above-mentioned utility, the compounds of this invention are also useful as intermediates in the manufacture of other valuable, particularly pharmacologically active compounds.

Particularly valuable are compounds of Formula I, in which each of $Ph_1$ and $Ph_2$ stands for 1,4-phenylene, (lower alkyl)-1,4-phenylene, di-(lower alkyl)-1,4-phenylene, (lower alkoxy)-1,4-phenylene, (halogeno)-1,4-phenylene, di-(halogeno)-1,4-phenylene, (lower alkyl, halogeno)-1,4-phenylene or (trifluoromethyl)-1,4-phenylene, X for halogen or trifluoromethyl, alk for 1,2-ethylene, 1,2- or 1,3-propylene, and Am for di-lower alklamino, lower alkyleneimino, mono-, aza-, oxa- or thia-lower alkyleneimino wherein the heteroatoms are separated from each other by at least two carbon atoms and their therapeutically useful acid addition salts.

Especially useful are the compounds of Formula II

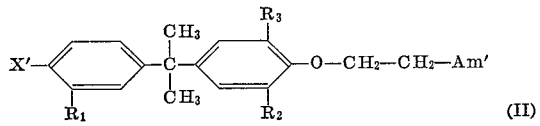

in which X' stands for chloro, bromo, iodo or trifluoromethyl, each of $R_1$, $R_2$ and $R_3$ for hydrogen, methyl or chloro and Am' for diethylamino or piperidino and their therapeutically useful acid addition salts which, when used in *in vitro* tests at about 5–100 γ/ml., or in *in vivo* tests with guinea pigs, using an about 0.5 to 5% topical solution or ointment, show outstanding activity against *Trichophyton mentagrophytes*.

The compounds of the present invention are prepared according to methods known per se, for example, by reacting the compounds of the formulae

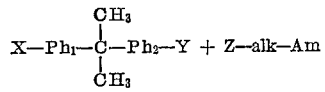

in which one of Y and Z stands for hydroxy and the other for reactively esterified hydroxy, or salts thereof and, if desired, converting any resulting compound into another compound disclosed.

In the above starting materials Y preferably represents hydroxy and Z a hydroxyl group esterified with a strong mineral acid, such as a hydrohalic acid, e.g. hydrochloric or hydrobromic acid or a sulfonic acid, such as a lower alkane sulfonic acid, e.g. methane sulfonic or ethane sulfonic acid, or a monocyclic carbocyclic aryl-sulfonic acid, e.g. p-toluene sulfonic acid. From the above phenolic starting material advantageously a salt is used, such as a metal, particularly an alkali metal, e.g. lithium, sodium, or potassium salt. This may be formed, for example, by reacting it with a metal salt-forming reagent, such as an alkali metal, e.g. sodium or potassium, an alkali metal hydride or amide, e.g. lithium hydride, sodium hydride sodium amide or potassium amide, or any other suitable reagent, such as an alkali metal lower alkanolate, e.g. lithium, sodium or potassium methanolate, ethanolate or tertiary butanolate or an alkali metal compound of a hydrocarbon, e.g. butyl lithium, phenyl lithium or phenyl sodium. The formation of the metal compounds is advantageously carried out in the presence of a solvent, e.g. liquid ammonia, hexane, benzene, toluene, xylene, diethyl ether, p-dioxane, tetrahydrofuran, diethyleneglycol dimethylether, dimethylformamide, a lower alkanol, e.g. methanol or ethanol or a solvent mixture; the choice of a solvent depends primarily on the type of reagent used and/or the solubility properties of the starting material.

The reaction of the phenolic starting material or the salt thereof, with the reagent Z-alk-Am, in which Z preferably is a halogen atom, is advantageously carried out in the presence of a diluent, for example, the solvent used for the preparation of the metal salt which, if desired, may be replaced or diluted with another solvent. If necessary, it is performed while cooling or preferably at an elevated temperature, in a closed vessel, and/or, in the atmosphere of an inert gas, e.g. nitrogen.

The starting material used in the above reaction is known or may be prepared according to known methods, for example, by reacting compounds of the formulae

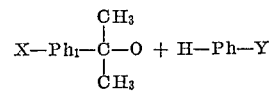

advantageously in the presence of a suitable Lewis acid, particularly a Friedel-Crafts reagent, e.g. aluminum chloride.

Into a resulting compound, there may be introduced a substituent; for example, upon treatment with a suitable nitrating reagent, e.g. fuming nitric acid in acetic acid anhydride and the like, a nitro group may be introduced into a 1,4-phenylene portion.

Furthermore, a substituent in a resulting compound may be converted into another substituent. For example, upon treatment with a suitable reducing reagent, e.g. hydrogen in the presence of a catalyst, such as palladium and the like, a nitro group in a resulting compound may be converted into amino; the latter may be diazotized and then treated with a cuprous halide to yield a compound substituted by halogeno.

Quaternary ammonium derivatives of the compounds of Formula I may be obtained, for example, by reacting the base with a reactive ester of an alcohol and a strong acid, such as, for example, one of the lower alkyl halides, di-lower alkyl-sulfates, lower alkyl sulfonates, phenyl-lower alkyl halides described above. The quaternizing reaction may be performed in the absence or presence of a solvent, while cooling or at an elevated temperature, if necessary, in a closed vessel and/or in the atmosphere of an inert gas, e.g. nitrogen and the like.

A resulting quaternary ammonium compound may be converted into another quaternary ammonium compound, such as quaternary ammonium hydroxide, for example, by reacting a quaternary ammonium halide with silver oxide, or a quaternary ammonium sulfate with barium hydroxide, by treating a quaternary ammonium salt with a hydroxyl ion exchange preparation, by electrodialysis or any other suitable method. A quaternary ammonium hydroxide may be converted into a quaternary ammonium salt by reacting the former with a suitable acid. A quaternary ammonium salt may also be converted directly into another quaternary ammonium salt. Thus, a quaternary ammonium iodide may be reacted with freshly prepared silver chloride or with hydrochloric acid in anhydrous methanol to yield the desired quaternary ammonium chloride; furthermore, a quaternary ammonium salt may be treated with a suitable anion exchange resin and thus be converted into another quaternary ammonium salt.

The compounds of the invention are obtained in the free form or in the form of their salts, depending on the conditions under which the process is carried out; the salts are also included in the present invention. Salts that are obtained can be converted into the free bases in known manner, for example, with alkalis or ion exchangers. Free bases that are obtained can be converted into salts by reaction with inorganic or organic acids, especially those that are suitable for the formation of therapeutically useful salts. Such acids are, for example, mineral acids, e.g. hydrochloric, hydrobromic, sulfuric, phosphoric, nitric, or perchloric acid; aliphatic or aromatic carboxylic or sulfonic acids, e.g. formic, acetic, propionic, succinic, glycollic, lactic, malic, tartaric, citric, ascorbic, maleic, hydroxymaleic, pyroracemic, phenylacetic, benzoic, 4-aminobenzoic, anthranilic, 4-hydroxybenzoic, salicylic, 4-aminosalicylic, embonic, nicotinic, methanesulfonic, ethanesulfonic, hydroxyethanesulfonic, ethylenesulfonic, halogenbenzenesulfonic, toluenesulfonic, naphthalenesulfonic and sulfanilic acid; methionine, tryptophane, lysine and arginine.

These or other salts of the invention, for example, the picrates, can also be used for purification of the bases obtained; the bases are converted into salts, the salts are separated and the bases are liberated from the salts. In view of the close relationship between the free compounds and the compounds in the form of their salts, whenever a free base is referred to in this context, a corresponding salt is also intended, provided such is possible or appropriate under the circumstances.

The invention further includes any variant of the present process, in which an intermediate product obtainable at any stage of the process is used as starting material and any remaining steps are carried out, or the process is discontinued at any stage thereof, or in which the starting materials are formed under the reaction conditions, or in which the reaction components are used in the form of their salts. Mainly, those starting materials should be used in the process of the invention that lead to the formation of those compounds indicated above as being specially valuable.

The compounds of the invention can be used, for example, for the manufacture of pharmaceutical compositions containing them in conjunction or admixture with inorganic or organic, solid or liquid pharmaceutical excipients, suitable for enteral, parenteral or preferably topical administration. Suitable excipients are substances that do not react with the compounds of the invention, for example, water, gelatine, sugars, e.g. lactose, glucose or sucrose, starches, e.g. corn starch or arrowroot, stearic acid or salts thereof, e.g. magnesium or calcium stearate, talc, vegetable fats or oils, gums, alginic acid, benzyl alcohols, glycols and other known excipients. The compositions may be, for example, in solid form as tablets, dragees or capsules, or in liquid form as solutions, suspensions or emulsions. They may be sterilized and/or contain adjuvants, such as preserving, stabilizing, wetting or emulsifying agents, solution promoters, salts for regulating the osmotic pressure and/or buffers. They may further contain other therapeutically valuable substances. Said pharmaceutical compositions are prepared by conventional methods and contain about 0.1 to 75%, more particularly 1 to 50%, of the active ingredient. They are also included within the scope of the present invention.

The following examples are intended to illustrate the invention and are not to be construed as being limitations thereon. Temperatures are given in degrees centigrade, and all parts wherever given are parts by weight.

EXAMPLE 1

To the solution of 12.33 g. 2-(4-chlorophenyl)-2-(4-hydroxyphenyl)-propane in a mixture of 75 ml. dimethylformamide and 40 ml. toluene is added in portions 2.4 g. of a 53% suspension of sodium hydride in mineral oil while stirring and cooling. After the hydrogen evolution ceases, a solution of 7.0 g. 2-diethylaminoethyl chloride in 35 ml. toluene is added dropwise while stirring and cooling. Stirring is continued for an additional three hours at room temperature, and the reaction mixture is then allowed to stand at that temperature for fifteen hours. The inorganic precipitate is filtered off, the filtrate is concentrated to a volume of about 50 to 80 ml., diluted with water and extracted with 300 ml. diethyl ether. The extract is separated and washed with 100 ml. of 2 N aqueous hydrochloric acid; the acid solution is separated, and after a few minutes, the 2-(4-chlorophenyl)-2-[4-(2-diethylaminoethoxy)-phenyl]-propane hydrochloride of the formula

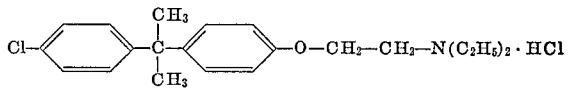

precipitates, it is collected and recrystallized from a mixture of ethanol and diethyl ether, M.P. 185–186°; yield: 18.7 g.

The starting material used is prepared as follows: To the ice-cooled Grignard reagent, prepared from 284.0 g. methyl iodide and 48.6 g. magnesium turnings in 550 ml. diethyl ether, is added dropwise a solution 154.6 g. 4-chloro-acetophenone in 200 ml. diethyl ether while stirring. The reaction mixture is allowed to stand at room temperature and is then heated to reflux for two hours. The Grignard complex is decomposed by slowly adding 300 ml. of a saturated aqueous solution of ammonium chloride and 300 ml. water while stirring and cooling in an ice bath, 300 ml. diethyl ether are added and the organic layer is separated, washed and dried over sodium sulfate. The solvent is removed, and the 2-(4-chlorophenyl)-2-propanol is obtained by distilling the residue, B.P. 92–96°/3 mm. Hg.

The mixture of 17.1 g. thereof and 9.4 g. phenol is added portionwise to the mixture of 28.2 g. phenol and 6.7 g. aluminum chloride while stirring and cooling with water. The reaction mixture is stirred at room temperature for two hours, allowed to stand for fifteen hours and is then heated for one hour to 40–50° while stirring. It is added to 100 ml. of 6 N aqueous hydrochloric acid while stirring; the organic layer is separated and the excess phenol is removed by distillation at temperatures up to 130°/13 mm. Hg. The oily residue is distilled to yield the 2-(4-chlorophenyl)-2-(4-hydroxyphenyl)-propane, which crystallizes from hexane, M.P. 72–74°.

EXAMPLE 2

The sodium salt, prepared from 5.6 g. 2-(4-chlorophenyl)-2-(3-chloro-4-hydroxyphenyl)-propane in 25 ml. dimethylformamide and 25 ml. toluene, and 1.0 g. of a 53% suspension of sodium hydride in mineral oil, is treated with a solution of 3.0 g. diethylaminoethyl chloride in 15 ml. toluene. The reaction mixture is worked up as described in Example 1 to yield the 2-(4-chlorophenyl)-2-[3-chloro-4-(2-diethylaminoethoxy) - phenyl]-propane of the formula

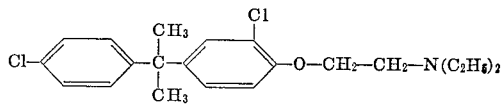

which is purified by distillation, B.P. 170°/0.05 mm.; 6.58 g. of a colorless oil are isolated.

The starting material used is prepared as follows: The mixture of 7.41 g. 2-(4-chlorophenyl)-2-(4-hydroxyphenyl)-propane and 10.0 g. of sulfuryl chloride is refluxed on the steam bath for three hours. The excess of sulfuryl chloride is evaporated and the residue is taken up into diethyl ether. The organic solution is washed with aqueous sodium hydrogencarbonate and saturated aqueous sodium chloride, dried over sodium sulfate and evaporated. The straw-colored residue is distilled to yield the desired 2 - (4-chlorophenyl)-2-(3-chloro-4-hydroxyphenyl)-propane, B.P. 165–170°/0.15 mm. Hg.

EXAMPLE 3

To the solution of 2.3 g. 2-(4-chlorophenyl)-2-[4-(2-diethylaminoethoxy)-phenyl] - propane in 50 ml. 95% ethanol 3 ml. ethyl bromide are added. The reaction mixture is placed into a stainless steel bomb and is heated on a steam bath for fifteen hours. The solvent is removed under reduced pressure, and the residue triturated with diethyl ether to yield the 2-(4-chloro-phenyl)-2-[4-(2-diethylaminoethoxy)-phenyl] - propane ethobromide of the formula

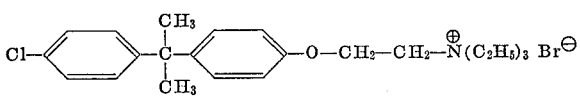

which is recrystallized from a mixture of acetone and diethyl ether and dried under reduced pressure, M.P. 132–146°; yield: 2.67 g.

EXAMPLE 4

To the solution of 5.0 g. 2-(4-chlorophenyl)-2-(4-hydroxyphenyl)-propane in 100 ml. of a 1:1-mixture of dimethylformamide and toluene, 3.8 g. freshly recrystallized 2-piperidinoethyl chloride hydrochloride are added. The resulting mixture is cooled to 5°, and treated, in small portions, with a total of 1.95 g. of a 53% suspension of sodium hydride in mineral oil. The reaction mixture is stirred at room temperature for 5 hours and then allowed to stand for 15 hours. The inorganic precipitate is filtered off, the filtrate concentrated to a volume of about 15 ml. and diluted with water. It is extracted with 1 N hydrochloric acid, the acidic extract made basic with solid sodium carbonate hydrate and extracted with diethyl ether. The organic solution yields 5.2 g. of the 2-(4-chlorophenyl) - 2 - [4-(2-piperidinoethoxy)-phenyl]-propane of the formula

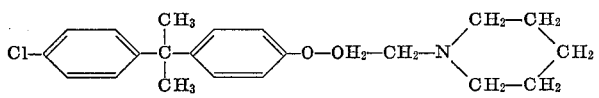

as a colorless viscous oil. It is converted into its hydrochloride by treatment with a solution of hydrogen chloride in diethyl ether. The salt melts at 183–185° after recrystallization from a 5:1:5-mixture of acetone, ethanol and diethyl ether.

EXAMPLE 5

To the solution of 11.5 g. 2-(4-bromophenyl)-2-(4-hydroxyphenyl)-propane in 100 ml. of a 1:1-mixture of dimethylformamide and toluene, 7.2 g. 2-piperidinoethyl chloride hydrochloride are added and the resulting suspension stirred and cooled in an ice-bath. It is treated with 3.6 g. of a 53% suspension of sodium hydride in mineral oil, which is added in portions. After the hydrogen evolution has ceased, stirring at room temperature is continued for six hours. The reaction mixture is allowed to stand at room temperature for fifteen hours and is then evaporated under reduced pressure. The residue is treated with water, and the mixture extracted with diethyl ether; the extract washed with 2 N hydrochloric acid and the acidic layer is made basic with a 50% aqueous sodium hydroxide and sodium carbonate while cooling in an ice-bath until the pH is about 8. The resulting gummy precipitate is taken up in diethyl ether, the organic solution dried over sodium sulfate and evaporated to yield 13.5 g. 2 - (4-bromophenyl)-2-[4-(2-piperidinoethoxy)-phenyl]-propane of the formula

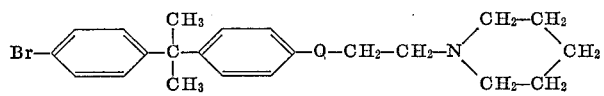

which melts at 77–78° after recrystallization from ethanol.

The starting material used is prepared as follows: To the Grignard reagent prepared from 15.4 g. magnesium and 91 g. methyl iodide in 350 ml. diethyl ether is added dropwise while stirring and cooling in an ice-bath, 105.7 g. 4-bromo-acetophenone in 200 ml. diethyl ether. The reaction mixture is refluxed for two hours, allowed to stand at room temperature for 18 hours and again refluxed for two hours. It is then decomposed with an aqueous solution of ammonium chloride, extracted with diethyl ether, the extract dried and evaporated to yield 98.0 g. oily 2-(4-bromophenyl)-2-propanol, which crystallizes from pentane while cooling, M.P. 37–43°.

The mixture of 43.0 g. thereof and 18.8 g. phenol is added dropwise to the solution of 37.6 g. phenol and 13.3 g. aluminum chloride while stirring and cooling in an ice-bath. The reaction mixture is stirred for an additional five hours, then allowed to stand at room temperature for fifteen hours, and decomposed with ice and concentrated hydrochloric acid. The organic material is extracted with diethyl ether; the extract washed with water and brine, dried over sodium sulfate and evaporated. The residue is distilled and the desired 2-(4-bromophenyl)-2-(4-hydroxyphenyl)-propane collected at 155–185°/0.02 mm. Hg, it crystallizes from hexane and melts at 89–90°.

EXAMPLE 6

The mixture of 0.25 g. 2 - (4-bromophenyl)-2-[4-(2-piperidinoethoxy)-phenyl]-propane and 5 ml. 2 N aqueous hydrochloric acid is heated on a water bath to complete dissolution. On cooling, the corresponding hydrochloride precipitates as an oil and crystallizes on standing. It is filtered off and recrystallized from acetone, M.P. 200–201°.

EXAMPLE 7

According to the procedure described in the previous examples, the following compounds are prepared from equivalent amounts of the corresponding starting material:

(a) 2-(4-chlorophenyl) - 2-[3-chloro-5-methyl-4-(2-diethylaminoethoxy)-phenyl]-propane hydrochloride, M.P. 146–148°. The 2 - (4 - chlorophenyl)-2-(3-chloro-4-hydroxy-5-methyl-phenyl)-propane boils at 125–126°/0.05 mm. Hg, it is prepared by reacting 2-(4-chlorophenyl)-2-propanol with 2-chloro-6-methyl-phenol in the presence of aluminum chloride and is purified over the benzoate, M.P. 129–130°;

(b) 2 - (4 - chlorophenyl) - 2 - [3,5 - dimethyl - 4 - (2-diethylaminoethoxy) - phenyl] - propane, B.P. 171–173°/0.05 mm. Hg, its hydrochloride melts at 173–174°. The 2 - (4 - chlorophenyl) - 2 - (3,5 - dimethyl - 4 - hydroxyphenyl)-propane melts at 47–48°; it is prepared by adding 17.1 g. 2-(4-chlorophenyl)-2-propanol and then 12.2 g. 2,6-xylenol to the mixture of 36.6 g. 2,6-xylenol and 6.7 g. aluminum chloride;

(c) 2 - (4 - fluorophenyl) - 2 - [4 - (2 - piperidinoethoxy)-phenyl]-propane, B.P. 170°/0.08 mm. Hg, its hydrochloride melts at 146–148° after recrystallization from a mixture of acetone and pentane. The 2-(4-fluorophenyl)-2-(4-hydroxyphenyl)-propane is prepared by reacting 4-fluoro-α-methyl-styrene with phenol in the presence of aluminum chloride, it melts at 36–38° after recrystallization from petroleum ether;

(d) 2 - (4 - chlorophenyl) - 2 - [4 - (2 - morpholinoethoxy)-phenyl]-propane hydrochloride, M.P. 211–213° after recrystallization from a 1:5:5-mixture of ethanol, acetone and diethyl ether;

(e) 2 - (4 - chlorophenyl) - 2 - [4 - (2 - pyrrolidinoethoxy)-phenyl]-propane hydrochloride, M.P. 174–175° after recrystallization from acetone;

(f) 2 - (4 - chlorophenyl) - 2 - [3 - chloro - 4 - (2 - piperidinoethoxy)-phenyl] - propane hydrochloride, M.P. 143–145° after recrystallization from acetone and diethyl ether;

(g) 2 - (4 - trifluoromethylphenyl) - 2 - [4 - (2 - diethylaminoethoxy)-phenyl]-propane hydrochloride M.P. 187–188° after recrystallization from a mixture of ethanol, acetone and n-hexane;

(h) 2 - (4 - iodophenyl) - 2 - [4 - (2 - piperidinoethoxy)-phenyl]-propane, M.P. 112–113°;

(i) 2 - (4 - bromophenyl) - 2 - [3 - chloro - 4 - (2 - piperidinoethoxy) - phenyl]propane hydrochloride, M.P. 178–179°;

(j) 2 - (2,4 - dichlorophenyl) - 2 - [4 - (2 - piperidinoethoxy)-phenyl]-propane hydrochloride, M.P. 202–205°;

(k) 2 - (3,4 - dichlorophenyl) - 2 - [4 - (2 - piperidinoethoxy) - phenyl] - propane hydrochloride, M.P. 188–189°; as well as 2-(4-chlorophenyl)-2-[4-(2-di-n-propylaminoethoxy)-phenyl]-propane, 2-(4-trifluoromethylphenyl)-2-[4-(2-N-benzyl-N-methylaminoethoxy)-phenyl]-propane, 2-(4-bromophenyl)-2-[4-(2-diethylaminoethoxy)-3,5-dimethyl-phenyl]-propane, 2-(4-chloro-phenyl)-2-[4-(2-diisopropylaminoethoxy)-phenyl]-propane, 2-(4-bromophenyl)-2-[4-(3-diethylaminopropoxy)-phenyl]-propane, 2-(3,4-dichlorophenyl)-2-[4-(2-morpholinoethoxy)-phenyl]-propane, 2-(4-chlorophenyl)-2-[4-(2-diethylamino)-3-methoxy-phenyl]-propane, 2-(4-chloro-3,5-dimethylphenyl)-2-[4-(2-piperidinoethoxy)-phenyl]-propane, 2-(4-chlorophenyl)-2-[4-(2-di-n-propylaminoethoxy)-phenyl]-propane, 2-(4-chlorophenyl)-2-[4-(2-dimethylaminoethoxy)-phenyl]-propane, 2-(3,4,5-trichlorophenyl)-2-[4-(2-diethylaminoethoxy)-phenyl]-propane, 2-(4-chlorophenyl)-2-[4-(2-diethylaminopropoxy)-phenyl]-propane, 2-(4-chlorophenyl)-2-[4-(4-diethylaminobutoxy)-phenyl]-propane, 2-(4-chlorophenyl)-2-[4-(3-piperidinopropoxy)-phenyl]-propane, 2-(4-bromo-phenyl)-2-[4-(2-dimethylaminoethoxy)-phenyl]-propane, 2-(3-methyl-4-chlorophenyl)-2-[3-chloro-4-(2-diethylaminoethoxy)-phenyl]-propane, 2-(2,4-dichlorophenyl)-2-[3-chloro-4-(2-diethylaminoethoxy)-phenyl]-propane, 2-(4-trifluoromethylphenyl)-2-[4-(2-diethylaminoethoxy)-3,5-dimethyl-phenyl]-propane, 2-(4-bromo-phenyl)-2-[4-(3-thiamorpholino-propoxy)-phenyl]-propane or 2-(4-chlorophenyl)-2-[4-(2-N-methylpiperazinoethoxy)-phenyl]-propane,

EXAMPLE 8

An ointment containing 1% of the active ingredient is prepared as follows:

Formula: G.
2 - (4 - chlorophenyl) - 2 - [4 - (2 - diethylaminoethoxy)-phenyl]-propane hydrochloride __ 1.0
Liquid petrolatum _____ 5.0
White petrolatum _____ 94.0

Procedure

The hydrochloride is mixed with the liquid petrolatum by using a mortar until an adequate reduction in particle size is accomplished. The white petrolatum is then slowly blended with this mixture and the ointment is passed through a three roller mill, until total uniformity is obtained. It is filled into 5 g. epoxy lined tubes.

EXAMPLE 9

A cream, containing 1% of the active ingredient is prepared as follows:

Formula: G.
2 - (4 - chlorophenyl) - 2 - [4 - (2 - diethylaminoethoxy)-phenyl] - propane hydrochloride _____ 1.0
Propylene glycol _____ 15.0
Sodium lauryl sulfate _____ 2.0
Cetyl alcohol _____ 15.0
Phenyl mercuric acetate _____ 0.002
Purified water q.s. _____ 100.0

Procedure

The phenylmercuric acetate is dissolved in 65 ml. water at 90°; subsequently the sodium lauryl sulfate is added and the temperature is reduced to 70°. The cetyl alcohol is melted at 70° and added to the aqueous solution while vigorously agitating. Stirring is continued while cooling the mixture to 45°. The hydrochloride is dispersed in the propylene glycol at 45° and added to the above emulsion while agitating. Sufficient water is added to bring the weight to 100 g. and mixing is continued while the product cools to room temperature. The cream is passed through a three roller mill until total uniformity is accomplished and is filled into 5 g. epoxy lined tubes.

EXAMPLE 10

A cream containing 2% of the active ingredient is prepared as follows:

Formula: G.
2 - (4 - chlorophenyl) - 2 - [4 - (2 - diethylaminoethoxy) - phenyl] - propane hydrochloride _____ 60.0
Glyceryl monostearate _____ 225.0
Lanolin, anhydrous _____ 30.0
Isopropyl myristate _____ 90.0
Polyethylene glycol 4000 monostearate ____ 300.0
Stearic acid _____ 390.0
Sorbitan sesquioleate _____ 15.0
Spermaceti _____ 180.0
Propylene glycol _____ 150.0
Polysorbate 60 _____ 45.0
Purified water _____ 1515.0

Procedure

The glyceryl monostearate, the lanolin, the isopropyl myristate, the polyethylene glycol 4000 monostearate, the stearic acid, the sorbitan sesquioleate, and the spermaceti are melted together at 80° on the water bath. The water containing the polysorbate 60 is added while stirring at 80°; stirring is continued until the temperature drops below 40°. The solution of the hydrochloride in propylene glycol is added, stirring is continued and water is added to bring the weight to 3000.0 g. The cream is passed through a homogenizer and filled into 5 g. tubes.

EXAMPLE 11

An ointment containing 1% of the active ingredient is prepared as follows:

Formula: G.
2-(4-bromophenyl) - 2 - [4 - (2 - piperidinoethoxy)-phenyl]-propane _____ 1.0
Liquid petrolatum _____ 5.0
White petrolatum _____ 94.0

Procedure

The active ingredient is mixed with the liquid petrolatum by using a mortar until an adequate reduction in particle size is accomplished. The white petrolatum is then slowly blended with this mixture and the ointment passed through a three roller mill until total uniformity is obtained. It is filled into epoxy lined 5 g. tubes.

EXAMPLE 12

A cream containing 2% of the active ingredient is prepared as follows:

Formula: G.
2-(4-bromophenyl)-2-[4 - (2 - piperidinoethoxy)-phenyl]-propane _____ 60.0
Glyceryl monostearate _____ 225.0
Lanolin, anhydrous _____ 30.0
Isopropyl myristate _____ 90.0
Polyethylene glycol 4000 monostearate ____ 300.0
Stearic acid _____ 390.0
Sorbitan sesquioleate _____ 15.0

| Formula. | G. |
|---|---|
| Spermaceti | 180.0 |
| Propylene glycol | 150.0 |
| Polysorbate 60 | 45.0 |
| Purified water | 1515.0 |

Procedure

As described in Example 10.

EXAMPLE 13

A cream containing 5% of the active ingredient is prepared as follows:

| Formula: | G. |
|---|---|
| 2-(4-bromophenyl)-2-[4 - (2 - piperidinoethoxy)-phenyl]-propane | 250.0 |
| Glyceryl monostearate | 375.0 |
| Lanolin, anhydrous | 50.0 |
| Isopropyl myristate | 150.0 |
| Polyethylene glycol 4000 monostearate | 400.0 |
| Stearic acid | 650.0 |
| Spermaceti | 300.0 |
| Sorbitan sesquioleate | 25.0 |
| Polyoxyethylene sorbitan monostearate | 75.0 |
| Propylene glycol | 250.0 |
| Purified water q.s. | 5000.0 |

Procedure

A mixture of the glyceryl monostearate, lanolin, isopropyl myristate, polyethyleneglycol 4000 monostearate, stearic acid, spermaceti and the sorbitan sesquiolate is melted in a jacketed mixer at 70°. Water is slowly added while stirring until the mixture congeals; the temperature is then brought to 40°. The polyoxyethylene sorbitan monostearate is dissolved in 1600 ml. water at 75° and the active ingredient dissolved in the solution while maintaining a temperature of about 60°. The mixture is then diluted with 500 ml. boiling water, and added to the cream base while stirring. Water is added to bring the weight up to 5000.0 g., the resulting cream passed through a homogenizer and filled into 5 g. tubes.

EXAMPLE 14

A cream containing 5% of the active ingredient is prepared as follows:

| Formula: | G. |
|---|---|
| 2-(4-chlorophenyl)-2-[4 - (2 - diethylaminooxy)-phenyl]-propane hydrochloride | 250.0 |
| Glyceryl monostearate | 375.0 |
| Lanolin, anhydrous | 50.0 |
| Isopropyl myristate | 150.0 |
| Polyethylene glycol 4000 monostearate | 400.0 |
| Stearic acid | 650.0 |
| Spermaceti | 300.0 |
| Sorbitan sesquioleate | 25.0 |
| Polyoxyethylene sorbitan monostearate | 75.0 |
| Propylene glycol | 250.0 |
| Purified water q.s. | 5000.0 |

Procedure

As described in Example 13.

What I claim is:

1. A member selected from the group consisting of the compound having the formula

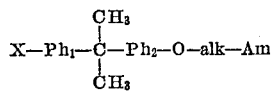

in which each of $Ph_1$ and $Ph_2$ is a member selected from the group consisting of 1,4-phenylene, (lower alkyl)-1,4-phenylene, di(lower alkyl) - 1,4-phenylene, (lower alkoxy) - 1,4-phenylene, (halogeno) - 1,4-phenylene and (lower alkyl, halogeno) - 1,4-phenylene, X is a member selected from the group consisting of halogen and trifluoromethyl, alk is lower alkylene separating Am from the oxygen atom by at least 2 carbon atoms and Am is a member selected from the group consisting of di-lower alkylamino, N-phenyl-lower alkyl-N-lower alkylamino, monocyclic 5 to 7 ring-membered lower alkyleneimino, piperazino, N-methylpiperazino, morpholino and thiamorpholino, lower alkyl quaternaries, phenyl-lower alkyl quaternaries and therapeutically useful acid addition salts thereof.

2. A compound as claimed in claim 1 and being a member selected from the group consisting of the compound having the formula

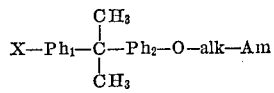

in which each of $Ph_1$ and $Ph_2$ is a member selected from the group consisting of 1,4-phenylene, (lower alkyl)-1,4-phenylene, di(lower alkyl) - 1,4-phenylene, (lower alkoxy) - 1,4-phenylene, (halogeno) - 1,4-phenylene, di-(halogeno) - 1,4-phenylene and (lower alkyl, halogeno)-1,4-phenylene, X is a member selected from the group consisting of halogen and trifluoromethyl, alk is a member selected from the group consisting of 1,2-ethylene, 1,2-propylene and 1,3-propylene and Am is a member selected from the group consisting of di-lower alkylamino, pyrrolidino, piperidino, piperazino, N-methylpiperazino, morpholino and thiamorpholino, and a therapeutically useful acid addition salt thereof.

3. A compound as claimed in claim 1 and being a member selected from the group consisting of the compound having the formula

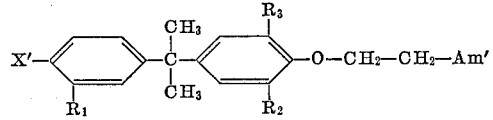

in which X' is a member selected from the group consisting of chloro, bromo, iodo and trifluoromethyl, each of $R_1$ $R_2$ and $R_3$ is a member selected from the group consisting of hydrogen, methyl and chloro and Am' is a member selected from the group consisting of diethylamino and piperidino and a therapeutically useful acid addition salt thereof.

4. A compound as claimed in claim 1 and being a member selected from the group consisting of the 2-(4-chlorophenyl) - 2-[4-(2 - diethylaminoethoxy)-phenyl]-propane and a therapeutically useful acid addition salt thereof.

5. A compound as claimed in claim 1 and being a member selected from the group consisting of the 2-(4-bromophenyl) - 2-[4-(2 - piperidinoethoxy)-phenyl]-propane and a therapeutically useful acid addition salt thereof.

References Cited

UNITED STATES PATENTS

| 2,703,324 | 2/1955 | Binkley et al. | |
| 2,935,439 | 4/1960 | Wright et al. | |
| 3,077,472 | 2/1963 | Burckhalter | 260—247.79 |
| 3,135,745 | 6/1964 | Palopoli et al. | 260—240 |
| 3,247,199 | 4/1966 | Marxer et al. | |

OTHER REFERENCES

Cheney et al., J. Am. Chem. Soc., vol. 71, pp. 60–64 (1949).

HENRY R. JILES, Primary Examiner

S. D. WINTERS, Assistant Examiner

U.S. Cl. X.R.

260—239, 243, 247.1, 247.2, 247.7, 268, 293.4 294, 294.7, 326.5, 570, 583, 618, 619; 424—244, 246, 248, 250, 267, 274, 329, 330